US011081007B2

(12) United States Patent
Morita (10) Patent No.: US 11,081,007 B2
(45) Date of Patent: Aug. 3, 2021

(54) ROAD SHAPE PREDICTION APPARATUS, OTHER-VEHICLE ROUTE PREDICTION APPARATUS, AND DRIVING ASSISTANCE APPARATUS

(71) Applicant: Mitsubishi Electric Corporation, Tokyo (JP)

(72) Inventor: Keisuke Morita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 383 days.

(21) Appl. No.: 15/834,165

(22) Filed: Dec. 7, 2017

(65) Prior Publication Data

US 2019/0066507 A1 Feb. 28, 2019

(30) Foreign Application Priority Data

Aug. 25, 2017 (JP) .............................. JP2017-161856

(51) Int. Cl.
*G08G 1/01* (2006.01)
*G08G 1/0967* (2006.01)
*G08G 1/16* (2006.01)
*H04W 84/00* (2009.01)

(52) U.S. Cl.
CPC .............. *G08G 1/161* (2013.01); *G08G 1/01* (2013.01); *G08G 1/09675* (2013.01); *G08G 1/096716* (2013.01); *G08G 1/096741* (2013.01); *G08G 1/096791* (2013.01); *G08G 1/166* (2013.01); *H04W 84/00* (2013.01); *G08G 1/163* (2013.01)

(58) Field of Classification Search
CPC .............. G08G 1/166; G08G 1/09675; G08G 1/096791; G08G 1/096716; G08G 1/096741; G08G 1/01; G08G 1/161; G08G 1/163; H04W 84/00
See application file for complete search history.

(56) References Cited

U.S. PATENT DOCUMENTS

2002/0198660 A1\* 12/2002 Lutter .................. G08G 1/0965
701/301
2007/0129892 A1\* 6/2007 Smartt .................... G01C 21/32
702/5
2007/0244643 A1\* 10/2007 Tengler .................. G08G 1/161
701/301

(Continued)

FOREIGN PATENT DOCUMENTS

JP 2016-110218 A 6/2016
JP 2018101376 A 6/2018

OTHER PUBLICATIONS

Communication dated Oct. 2, 2018, from Japanese Patent Office in counterpart application No. 2017-161856.

*Primary Examiner* — Stephen Holwerda
(74) *Attorney, Agent, or Firm* — Sughrue Mion, PLLC; Richard C. Turner (57) ABSTRACT

There are provided a road shape predictor predicts the shape of a road, based on positional information pieces, on other vehicles existing in the vicinity of a reference vehicle, that are obtained from the communicator and a road shape prediction priority determiner that determines the priorities of areas in the vicinity of the reference vehicle in the case where the road shape predictor predicts the shape of the road for the predicted route of the reference vehicle.

17 Claims, 5 Drawing Sheets

(56) References Cited

U.S. PATENT DOCUMENTS

| | | | |
|---|---|---|---|
| 2007/0282532 A1* | 12/2007 | Yamamoto | B60R 21/0134 |
| | | | 701/301 |
| 2009/0024273 A1* | 1/2009 | Follmer | G06Q 40/08 |
| | | | 701/33.4 |
| 2010/0010699 A1* | 1/2010 | Taguchi | G08G 1/167 |
| | | | 701/23 |
| 2012/0016581 A1* | 1/2012 | Mochizuki | G08G 1/161 |
| | | | 701/301 |
| 2016/0155329 A1 | 6/2016 | Goto et al. | |
| 2017/0274820 A1* | 9/2017 | Goudy | B60Q 9/008 |
| 2018/0032040 A1* | 2/2018 | Sweet, III | G05B 15/02 |

* cited by examiner

ROAD SHAPE PREDICTION APPARATUS, OTHER-VEHICLE ROUTE PREDICTION APPARATUS, AND DRIVING ASSISTANCE APPARATUS

BACKGROUND OF THE INVENTION

Field of the Invention

The present invention relates to a road shape prediction apparatus and an other-vehicle route prediction apparatus capable of predicting the road shapes of surrounding areas and predicting the routes of other vehicles, respectively, through communication among vehicles, and to a driving assistance apparatus equipped with these apparatuses.

Description of the Related Art

In recent years, a driving-assistance mechanism has been drawing attention in which another vehicle's approach to a reference vehicle is detected by utilizing positional information on other vehicles, obtained through wireless communication among vehicles, and then there is performed notification of the risk that the foregoing other vehicle approaching to the reference vehicle collides with the reference vehicle. In the case where collision between a reference vehicle and another vehicle that are traveling, for example, on a curved road is predicted by use of positional information on the reference vehicle and the foregoing other vehicle, the fact that the road is curved causes the distance between the two vehicles that are traveling on the real road to be longer than the distance, between the two vehicles, that is estimated based on the positional information on the vehicles; thus, no appropriate collision prediction may not be performed.

In this case, utilization of map information for car navigation or the like makes it possible to perform road-shape-conscious collision prediction; however, there has been a problem that a vehicle equipped of no map information cannot perform road-shape-conscious collision prediction.

In a conventional technology disclosed in Patent Document 1, in order to solve the foregoing problem, the histories of positional information pieces of other vehicles in the vicinity of a reference vehicle are combined with one another so that the shape of the road is predicted; then, although not provided with map information, based on the predicted road shape, the reference vehicle predicts the routes of the other vehicles, which are observation subjects, in consideration of the road shape so as to prevent erroneous determination on the collision between the reference vehicle and the other vehicles.

PRIOR ART REFERENCE

Patent Document

[Patent Document 1] Japanese Patent Application Laid-Open No. 2016-110218

However, in the case of the conventional apparatus disclosed in Patent Document 1, when the number of vehicles, as the communication subjects, increases, the processing load becomes large and hence the road shape prediction and the route prediction for other vehicles based on the road shape prediction cannot secure the real-time properties thereof; thus, the collision prediction may be delayed.

The present invention has been implemented in order to solve the foregoing problems in the conventional apparatus; the objective thereof is to provide a road shape prediction apparatus that can predict a road shape while securing the real-time property.

Moreover, the objective thereof is to provide an other-vehicle route prediction apparatus that can predict the routes of other vehicles while securing the real-time property.

Furthermore, the objective thereof is to provide a driving assistance apparatus that can assist driving of a reference vehicle while securing the real-time property.

SUMMARY OF THE INVENTION

A road shape prediction apparatus according to the present invention is characterized by including a communicator provided in a reference vehicle to receive, through wireless communication, positional information pieces on other vehicles from the other vehicles that exist on a road on which the reference vehicle travels and that are in the vicinity of the reference vehicle;

a reference-vehicle route predictor to predict a route of the reference vehicle, based on at least one of a driving state of the reference vehicle and a positional relationship between the reference vehicle and the other vehicles existing in the vicinity of the reference vehicle;

a road shape predictor to predict the shape of the road, based on the positional information pieces, on the other vehicles existing in the vicinity of the reference vehicle, that are obtained from the communicator; and a road shape prediction priority determiner to determine the priorities of areas in the vicinity of the reference vehicle in the case where the road shape prediction unit predicts the shape of the road for the route, of the reference vehicle, that is predicted by the reference-vehicle route predictor.

An other-vehicle route prediction apparatus according to the present invention is characterized by including a communicator provided in a reference vehicle to receive, through wireless communication, positional information pieces on other vehicles from the other vehicles that exist on a road on which the reference vehicle travels and that are in the vicinity of the reference vehicle;

a reference-vehicle route predictor to predict a route of the reference vehicle, based on at least one of a driving state of the reference vehicle and a positional relationship between the reference vehicle and the other vehicles existing in the vicinity of the reference vehicle;

an other-vehicle route predictor to predict the routes of the other vehicles existing in the vicinity of the reference vehicle, based on the positional information pieces, on the other vehicles existing in the vicinity of the reference vehicle, that are obtained from the communicator; and an other-vehicle route prediction priority determiner to determine the priorities of areas in the vicinity of the reference vehicle in the case where the other-vehicle route predictor predicts the routes of the other vehicles for the route, of the reference vehicle, that is predicted by the reference-vehicle route predictor.

Furthermore, a driving assistance apparatus according to the present invention is characterized by including a communicator provided in a reference vehicle to receive, through wireless communication, positional information pieces on other vehicles from the other vehicles that exist on a road on which the reference vehicle travels and that are in the vicinity of the reference vehicle, a reference-vehicle route predictor to predict a route of the reference vehicle, based on at least one of a driving state of the reference vehicle and a positional relationship between the reference vehicle and the other vehicles existing in the vicinity of the reference vehicle, a road shape predictor to predict the shape of the road, based on the positional information pieces, on the other vehicles existing in the vicinity of the reference vehicle, that are obtained from the communicator, a road shape prediction priority determiner to determine the priorities of areas in the vicinity of the reference vehicle, for which the road shape prediction unit predicts the shape of the road, an other-vehicle route predictor to predict the routes of the other vehicles existing in the vicinity of the reference vehicle, based on the positional information pieces, on the other vehicles existing in the vicinity of the reference vehicle, that are obtained from the communicator, an other-vehicle route prediction priority determiner to determine the priorities of areas in the vicinity of the reference vehicle, for which the other-vehicle route prediction unit predicts the routes of the other vehicles, a collision determiner to determine a risk of collision between the reference vehicle and the other vehicles, based on the route, of the reference vehicle, that is predicted by the reference-vehicle route predictor and the routes, of the other vehicles, that are predicted by the other-vehicle route predictor, and a driving assistor to perform driving assistance for the reference vehicle in accordance with the risk of collision, determined by the collision determiner.

A road shape prediction apparatus according to the present invention includes a communicator provided in a reference vehicle to receive, through wireless communication, positional information pieces on other vehicles from the other vehicles that exist on a road on which the reference vehicle travels and that are in the vicinity of the reference vehicle;

a reference-vehicle route predictor to predict a route of the reference vehicle, based on at least one of a driving state of the reference vehicle and a positional relationship between the reference vehicle and the other vehicles existing in the vicinity of the reference vehicle;

a road shape predictor to predict the shape of the road, based on the positional information pieces, on the other vehicles existing in the vicinity of the reference vehicle, that are obtained from the communicator; and a road shape prediction priority determiner to determine the priorities of areas in the vicinity of the reference vehicle in the case where the road shape prediction unit predicts the shape of the road for the route, of the reference vehicle, that is predicted by the reference-vehicle route predictor; therefore, it is made possible to secure the real-time property, without raising the performance of a calculation device, and to predict the road shape, based on the positional information pieces obtained from the other vehicles existing in the vicinity of the reference vehicle.

An other-vehicle route prediction apparatus according to the present invention includes a communicator provided in a reference vehicle to receive, through wireless communication, positional information pieces on other vehicles from the other vehicles that exist on a road on which the reference vehicle travels and that are in the vicinity of the reference vehicle;

a reference-vehicle route predictor to predict a route of the reference vehicle, based on at least one of a driving state of the reference vehicle and a positional relationship between the reference vehicle and the other vehicles existing in the vicinity of the reference vehicle;

an other-vehicle route predictor to predict the routes of the other vehicles existing in the vicinity of the reference vehicle, based on the positional information pieces, on the other vehicles existing in the vicinity of the reference vehicle, that are obtained from the communicator; and an other-vehicle route prediction priority determiner to determine the priorities of areas in the vicinity of the reference vehicle in the case where the other-vehicle route predictor predicts the routes of the other vehicles for the route, of the reference vehicle, that is predicted by the reference-vehicle route predictor; therefore, it is made possible to secure the real-time property, without raising the performance of a calculation device, and to predict the routes of the other vehicles, based on the positional information pieces obtained from the other vehicles existing in the vicinity of the reference vehicle.

Furthermore, a driving assistance apparatus according to the present invention includes a communicator provided in a reference vehicle to receive, through wireless communication, positional information pieces on other vehicles from the other vehicles that exist on a road on which the reference vehicle travels and that are in the vicinity of the reference vehicle, a reference-vehicle route predictor to predict a route of the reference vehicle, based on at least one of a driving state of the reference vehicle and a positional relationship between the reference vehicle and the other vehicles existing in the vicinity of the reference vehicle, a road shape predictor to predict the shape of the road, based on the positional information pieces, on the other vehicles existing in the vicinity of the reference vehicle, that are obtained from the communicator, a road shape prediction priority determiner to determine the priorities of areas in the vicinity of the reference vehicle, for which the road shape prediction unit predicts the shape of the road, an other-vehicle route predictor to predict the routes of the other vehicles existing in the vicinity of the reference vehicle, based on the positional information pieces, on the other vehicles existing in the vicinity of the reference vehicle, that are obtained from the communicator, an other-vehicle route prediction priority determiner to determine the priorities of areas in the vicinity of the reference vehicle, for which the other-vehicle route prediction unit predicts the routes of the other vehicles, a collision determiner to determine a risk of collision between the reference vehicle and the other vehicles, based on the route, of the reference vehicle, that is predicted by the reference-vehicle route predictor and the routes, of the other vehicles, that are predicted by the other-vehicle route predictor, and a driving assistor to perform driving assistance for the reference vehicle in accordance with the risk of collision, determined by the collision determiner; therefore, it is made possible to secure the real-time property, without raising the performance of a calculation device, to determine the risk of collision between the reference vehicle and the other vehicles, while considering the road shape, and to perform driving assistance for the reference vehicle, based on the result of the determination.

The foregoing and other object, features, aspects, and advantages of the present invention will become more apparent from the following detailed description of the present invention when taken in conjunction with the accompanying drawings.

DETAILED DESCRIPTION OF THE PREFERRRED EMBODIMENTS

Hereinafter, embodiments of a road shape prediction apparatus, an other-vehicle route prediction apparatus, and a driving assistance apparatus equipped with the road shape prediction apparatus and the other-vehicle route prediction apparatus according to the present invention will be explained in detail, based on the drawings. A road shape prediction apparatus, an other-vehicle route prediction apparatus, and a driving assistance apparatus equipped with the road shape prediction apparatus and the other-vehicle route prediction apparatus according to the present invention are not limited to the after-mentioned embodiments; in the scope within the spirits of the present invention, the configurations of the embodiments can partially be modified or can partially be omitted.

Embodiment 1

Figure 1:
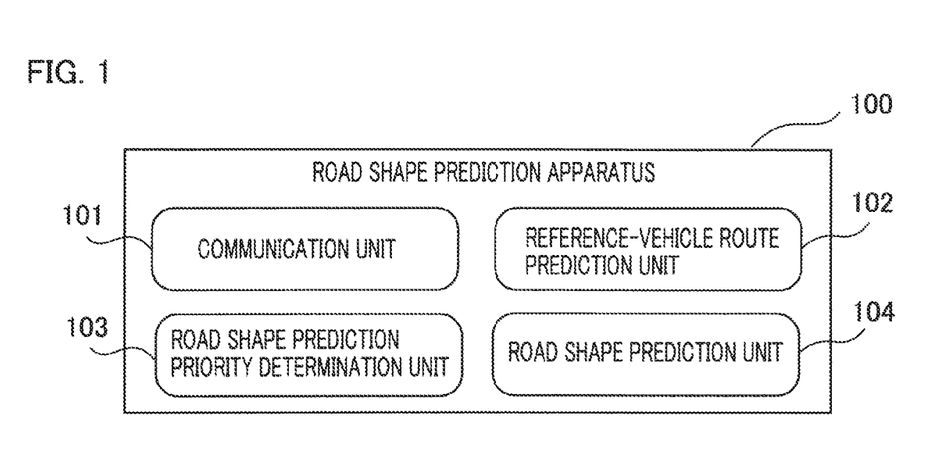
FIG. 1 is a block diagram of a road shape prediction apparatus according to Embodiment 1 of the present invention.

A road shape prediction apparatus according to Embodiment 1 of the present invention predicts the shapes of roads in the vicinity of a reference vehicle, by use of positional information on other vehicles existing in the vicinity of the reference vehicle; the area having a high probability of becoming the route of the reference vehicle is preferentially processed. FIG. 1 is a block diagram of a road shape prediction apparatus according to Embodiment 1 of the present invention. In FIG. 1, a road shape prediction apparatus 100 mounted in a reference vehicle is provided with a communication unit 101 as a communicator, a reference-vehicle route prediction unit 102 as a reference-vehicle route predictor, a road shape prediction priority determination unit 103 as road shape prediction priority determiner, and a road shape prediction unit 104 as a road shape predictor.

Figure 7:
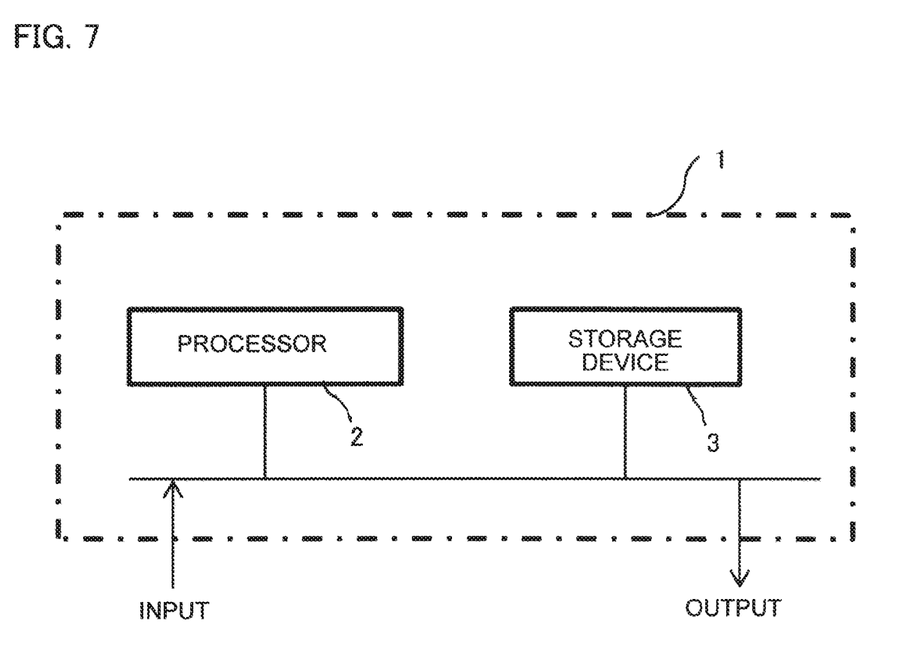
FIG. 7 is a block diagram showing the example of the hardware composition of the road shape prediction apparatus according to Embodiment 1, or the other-vehicle route prediction apparatus according to Embodiment 2, or the driving assistance apparatus according to Embodiment 3.

In the road shape prediction apparatus 100 according to Embodiment 1 of the present invention, at least part of the communication unit 101, the reference-vehicle route prediction unit 102, the road shape prediction priority determination unit 103, and the road shape prediction unit 104 can be configured by use of a predetermined program stored in a memory and a microprocessor that implements processing, based on the program, as shown in FIG. 7. That is, FIG. 7 is a block diagram showing the example of the hardware composition of the road shape prediction apparatus according to Embodiment 1. In FIG. 7, the processing apparatus 1 is composed of a microprocessor 2 and a storage device 3. The storage device 3 includes, although not shown, a volatile storage device such as a random access memory, and a nonvolatile auxiliary storage device such as a flash memory. The storage device 3 may include, instead of a flash memory, an auxiliary storage device such as a hard disk. The microprocessor 2 executes a program loaded from the storage device 3. In this case, the program is loaded from the auxiliary storage device to the microprocessor 2 via the volatile storage device. The microprocessor 2 may output data of the calculation result and the like to the volatile storage device of the storage device 3, or may store the data in the auxiliary storage device via the volatile storage device.

By use of, for example, the high-grade road traffic system ITS (Intelligent Transport Systems), the communication unit 101 performs wireless communication between the reference vehicle and other vehicles and can perform wireless communication between the reference vehicle and a base station founded at a crossing or the like; through the wireless communication, the communication unit 101 can receive positional information on other vehicles from the other vehicles existing in the vicinity of the reference vehicle.

Figure 2:
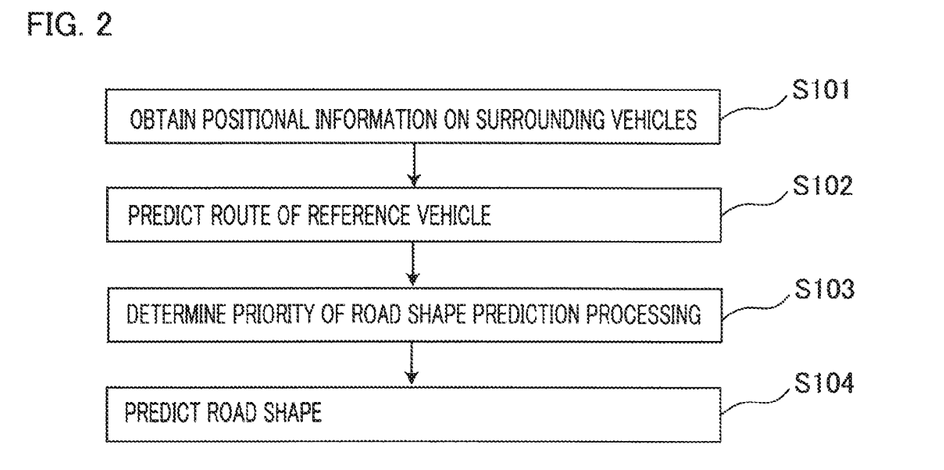
FIG. 2 is a flowchart representing the processing by the road shape prediction apparatus according to Embodiment 1 of the present invention.

FIG. 2 is a flowchart representing the processing by the road shape prediction apparatus according to Embodiment 1 of the present invention. Hereinafter, the contents of processing items in the respective steps will be explained in detail, based on FIG. 2. In the step S101, the road shape prediction apparatus 100 receives positional information on other vehicles, by use of the communication unit 101. The positional information on other vehicles may include not only the present positional information but also the history of positional information pieces obtained by tracking back for a certain period of time. Moreover, information pieces indicating the behaviors of other vehicles, such as the speeds and the traveling directions of the other vehicles, may be added to the positional information.

Next, in the step S102, the road shape prediction apparatus 100 predicts the route of the reference vehicle, by use of the reference-vehicle route prediction unit 102. For example, in the case where the reference vehicle is in a driving state in which the gear of the transmission thereof is set to a "forward" position for making the reference vehicle travel forward, the reference-vehicle route prediction unit 102 determines that the probability that the reference vehicle travels forward is high; in contrast, in the case where the reference vehicle is in a driving state in which the gear of the transmission thereof is set to a "backward" position for making the reference vehicle travel backward, the reference-vehicle route prediction unit 102 determines that the probability that the reference vehicle travels backward is high.

Moreover, in the case where the reference vehicle is in a driving state in which the winker light, which is a direction indicator thereof, indicates the "right", the reference-vehicle route prediction unit 102 determines that the probability that the reference vehicle immediately turns to the right or the probability that the reference vehicle travels straightforward up to a crossing or the like and then turns to the right is high; in the case where the reference vehicle is in a driving state in which the winker light thereof indicates the "left", the reference-vehicle route prediction unit 102 determines that the probability that the reference vehicle immediately turns to the left or the probability that the reference vehicle travels straightforward up to a crossing or the like and then turns to the left is high. Furthermore, in the case where the reference vehicle is in a driving state in which the winker light thereof indicates neither the "right" nor the "left", the reference-vehicle route prediction unit 102 determines that the probability that the reference vehicle continuously travels straightforward is high.

The reference-vehicle route prediction unit 102 compares the positional information on the reference vehicle with the positional information pieces on other surrounding vehicles that are traveling in a direction the same as that of the reference vehicle and in the vicinity of the reference vehicle so as to determine whether the reference vehicle exists on a traffic lane that is at the right side of the other vehicles in the vicinity thereof, the reference vehicle exists on a traffic lane that is at the left side of the other vehicles in the vicinity thereof, or the reference vehicle exists on a traffic lane that is in the middle of the traffic lanes of the other vehicles in the vicinity thereof. Thus, the reference-vehicle route prediction unit 102 compares the positional information on the reference vehicle with the positional information pieces on other vehicles in the vicinity thereof; when determining that the reference vehicle exists on a traffic lane that is at the right side of the other vehicles in the vicinity thereof, the reference-vehicle route prediction unit 102 determines that the probability that the reference vehicle travels straightforward or turns to the right is high and determines that the probability that the reference vehicle turns to the left is low, because the reference vehicle is required to move to the left traffic lane when turns to the left.

Moreover, the reference-vehicle route prediction unit 102 compares the positional information on the reference vehicle with the positional information pieces on other vehicles in the vicinity thereof; when determining that the reference vehicle exists on a traffic lane that is at the left side of the other vehicles in the vicinity thereof, the reference-vehicle route prediction unit 102 determines that the probability that the reference vehicle travels straightforward or turns to the left is high and determines that the probability that the reference vehicle turns to the right is low, because the reference vehicle is required to move to the right traffic lane when turns to the right. The reference-vehicle route prediction unit 102 compares the positional information on the reference vehicle with the positional information pieces on other vehicles in the vicinity thereof; when determining that the reference vehicle exists on a traffic lane that is in the middle of the traffic lanes of the other vehicles, the reference-vehicle route prediction unit 102 determines that the probability that the reference vehicle travels straightforward is high and that the probability that the reference vehicle turns to the right or to the left is low.

When during periodic processing by the road shape prediction apparatus 100, it is not predicted that within the coverage of the previously predicted road shape, a crossing exists on the route of the reference vehicle, the reference-vehicle route prediction unit 102 determines that the probability that the reference vehicle travels straightforward is high.

Next, in the step S103, the road shape prediction apparatus 100 determines the priority of road shape prediction processing, by use of the road shape prediction priority determination unit 103. It is desirable that prediction of a road shape is performed after comprehending in further detail the path on which the reference vehicle may travel and the road shapes in the vicinity thereof. Accordingly, the road shape prediction priority determination unit 103 in the road shape prediction apparatus 100 comprehends in further detail the path on which the reference vehicle may travel and the road shapes in the vicinity thereof, and then determines that the priority of each of the area in which the probability that the reference vehicle is going to travel is high and the vicinity thereof is high and determines that the priority of the other areas is low.

Specifically, the road shape prediction priority determination unit 103 firstly determines that the priority of the vicinity of the reference vehicle is high, regardless of the foregoing driving state of the reference vehicle. In the case of a driving state in which the gear of the transmission of the reference vehicle is set to the "forward" position, the road shape prediction priority determination unit 103 determines that the priority of the forward area of the reference vehicle is high; in the case of a driving state in which the gear of the transmission of the reference vehicle is set to the "backward" position, the road shape prediction priority determination unit 103 determines that the priority of the backward area of the reference vehicle is high.

Furthermore, when the winker light of the reference vehicle indicates the "right", the reference-vehicle route prediction unit 102 determines, as described above, that the reference vehicle turns to the right immediately or that the reference vehicle travels forward for some time and then turns to the right; thus, the road shape prediction priority determination unit 103 determines that the priority of each of the right-hand area and the forward area of the reference vehicle is high. When the winker light of the reference vehicle indicates the "left", the reference-vehicle route prediction unit 102 determines, as described above, that the probability that the reference vehicle turns to the left immediately or that the reference vehicle travels straightforward up to a crossing or the like and then turns to the left is high; thus, the road shape prediction priority determination unit 103 determines that the priority of each of the left-hand area and the forward area of the reference vehicle is high.

When the winker light of the reference vehicle indicates neither the "right" nor the "left", the reference-vehicle route prediction unit 102 determines, as described above, that the probability that the reference vehicle continuously travels straightforward is high; however, because in this case, there exists a probability that the reference vehicle travels in a curving manner or that the reference vehicle travels turns to the right or left without flashing the winker light, the road shape prediction priority determination unit 103 determines that the priority of the forward area of the reference vehicle is highest and the priority of each of the right-hand area and the left-hand area of the reference vehicle is second highest.

With regard to the priority determination by the road shape prediction priority determination unit 103, further segmentation of the surrounding area of the reference vehicle makes it possible to perform further detailed prioritization; the foregoing priority determination is only an example, and the priority determination is not limited thereto.

Next, in the step S104, the road shape prediction apparatus 100 predicts a road shape, by use of the road shape prediction unit 104. Because in many cases, other-vehicle information pieces obtained from the other vehicles existing in the vicinity of the reference vehicle indicate the positions of the other vehicles on roads, the road shape can be presumed by collecting the positional information pieces on many other vehicles. In particular, by monitoring the progress of the positional information on one and the same other vehicle, the shape of a road, as the path on which the other vehicle has actually traveled, can further accurately be predicted. The progress of the positional information on the one and the same other vehicle can be obtained by continuously monitoring, in the reference vehicle, the positional information on the one and the same other vehicle. Alternatively, in the case where the other vehicles store, as a series of positional information pieces, the respective histories of the positional information pieces of their own and transmit the stored series of positional information pieces at an appropriate timing, the reference vehicle receives the stored series of positional information pieces, so that the progress of the positional information on the one and the same other vehicle can be obtained.

When predicting a road shape, the road shape prediction unit 104 performs processing for predicting the road shape in a procedure corresponding to the priority determined in the foregoing step S103. For example, with regard to the prediction of the road shape, the more other-vehicle positional information to be utilized is, the more detailed and the more accurate prediction of the road shape can be performed. However, when the amount of other-vehicle positional information increases, the processing loads and the usage amount of memories increase. Thus, in order to suppress the processing loads and the usage amount of memories, the road shape prediction unit 104 utilizes the priority determined by the foregoing road shape prediction priority determination unit 103 and performs processing in such a way as to obtain a large amount of other-vehicle positional information, for a high-priority area, that is utilized for predicting the road shape and in such a way as to obtain a small amount of other-vehicle positional information for a low-priority area.

In this situation, it is assumed that in the case where the positional information on another vehicle existing in the vicinity of the reference vehicle includes the present positional information and the history of past positional information pieces and the present positional information on the foregoing another vehicle exists in the high-priority area determined by the road shape prediction priority determination unit 103, it is determined that the probability that the foregoing another vehicle exists in an area where the priority of its history of past positional information pieces is higher than that of each of the other vehicles existing in low-priority area is high. In this case, at first, only the present positional information pieces on other vehicles are checked and the information on the other vehicles existing in low-priority areas are omitted, so that it is not required to deal with the histories of past positional information pieces on the other vehicles in low-priority areas; the processing load on the road shape prediction apparatus 100 and the usage amount of memories can be reduces.

When the processing period of the road shape prediction apparatus 100 is short, the positional information can always be updated to the latest information; however, the processing load increases. Thus, it is made possible that in order to suppress the processing load, the implementation frequency of the road shape prediction processing for a high-priority area is raised and the frequency for a low-priority area is lowered. Also in this case, as is the case with the foregoing method of controlling the amount of the positional information on other vehicles in accordance with the priority, only the present other-vehicle positional information is monitored and there are provided a period in which the positional information pieces on vehicles existing in a low-priority area is dealt with and a period in which the positional information pieces on vehicles existing in a low-priority area is not dealt with, so that margin for the processing ability is provided to the road shape prediction apparatus 100. Therefore, by performing other processing items while the margin for the processing ability is provided, the total processing load can be reduced.

In the road shape prediction apparatus according to Embodiment 1 of the present invention, in the case where based on other-vehicle positional information obtained from the other vehicles in the vicinity of a reference vehicle, the shape of a road in the vicinity of the reference vehicle is predicted, there is determined an area that may become the route of the reference vehicle with high probability and the processing resource is provided intensively to the processing for predicting the road shape in that area, so that a detailed map for the route of the reference vehicle can be obtained while the total processing load is suppressed from increasing.

The road shape prediction apparatus according to Embodiment 1 of the present invention, described heretofore, is obtained by converting the inventions, described below, into tangible forms.

(1) A road shape prediction apparatus comprising:

a communicator provided in a reference vehicle to receive, through wireless communication, positional information pieces on other vehicles from the other vehicles that exist on a road on which the reference vehicle travels and that are in the vicinity of the reference vehicle;

a reference-vehicle route predictor to predict a route of the reference vehicle, based on at least one of a driving state of the reference vehicle and a positional relationship between the reference vehicle and the other vehicles existing in the vicinity of the reference vehicle;

a road shape predictor to predict the shape of the road, based on the positional information pieces, on the other vehicles existing in the vicinity of the reference vehicle, that are obtained from the communicator; and a road shape prediction priority determiner to determine the priorities of areas in the vicinity of the reference vehicle in the case where the road shape prediction unit predicts the shape of the road for the route, of the reference vehicle, that is predicted by the reference-vehicle route predictor.

(2) The road shape prediction apparatus according to (1), wherein the driving state of the reference vehicle is based on setting of a gear of a transmission of the reference vehicle, wherein in the case where the gear is set to a position for making the reference vehicle travel forward, the reference-vehicle route predictor determines that the probability that the reference vehicle travels forward is high and then predicts the route of the reference vehicle, and wherein in the case where the gear is set to a position for making the reference vehicle travel backward, the reference-vehicle route predictor determines that the probability that the reference vehicle travels backward is high and then predicts the route of the reference vehicle.

(3) The road shape prediction apparatus according to (1), wherein the driving state of the reference vehicle is based on an indication of a winker light that indicates a traveling direction of the reference vehicle, wherein in the case where the indication of the winker light indicates that the reference vehicle turns to the right, the reference-vehicle route predictor determines that the probability that the reference vehicle turns to the right or travels straightforward and then turns to the right is high and then predicts the route of the reference vehicle, wherein in the case where the indication of the winker light indicates that the reference vehicle turns to the left, the reference-vehicle route predictor determines that the probability that the reference vehicle turns to the left or travels straightforward and then turns to the left is high and then predicts the route of the reference vehicle, and wherein in the case where the indication of the winker light indicates that the reference vehicle neither turns to the right nor turns to the left, the reference-vehicle route predictor determines that the probability that the reference vehicle travels straightforward is high and then predicts the route of the reference vehicle.

(4) The road shape prediction apparatus according to (1), wherein in the case where based on a relationship between the positional information pieces, on the other vehicles in the vicinity of the reference vehicle, that are obtained from the communicator and the positional information on the reference vehicle, it is determined that the reference vehicle exists on the right-hand traffic lane of the road, the reference-vehicle route predictor determines that the probability that the reference vehicle travels straightforward or turns to the right is high, and wherein in the case where based on a relationship between the positional information pieces, on the other vehicles in the vicinity of the reference vehicle, that are obtained from the communicator and the positional information on the reference vehicle, it is determined that the reference vehicle exists on the left-hand traffic lane of the road, the reference-vehicle route predictor determines that the probability that the reference vehicle travels straightforward or turns to the left is high.

(5) The road shape prediction apparatus according to (1), wherein the road shape predictor predicts the shape of the road in such a way that the amount of positional information on the other vehicle existing in the area, the priority, determined by the road shape prediction priority determiner, of which is high is made to be larger than the amount of positional information on the other vehicle existing in areas other than the high-priority area, and wherein the road shape predictor predicts the shape of the road in such a way that the amount of positional information on the other vehicle existing in the area, the priority, determined by the road shape prediction priority determiner, of which is low is made to be smaller than the amount of positional information on the other vehicle existing in the high-priority area.

(6) The road shape prediction apparatus according to (1), wherein in the area, the priority, determined by the road shape prediction priority determiner, of which is high, the road shape predictor makes the period of processing for predicting the shape of the road shorter than the period of processing for predicting the shape of the road in areas other than the high-priority area, and wherein in the area, the priority, determined by the road shape prediction priority determiner, of which is low, the road shape predictor makes the period of processing for predicting the shape of the road longer than the period of processing for predicting the shape of the road in the high-priority area.

Embodiment 2

An other-vehicle route prediction apparatus according to Embodiment 2 of the present invention predicts the routes of the other vehicles existing in the vicinity of a reference vehicle, by use of positional information on the other vehicles existing in the vicinity of the reference vehicle; for example, the area having a high probability of becoming the route of the reference vehicle is preferentially processed so that the routes of the other vehicles are predicted.

Figure 3:
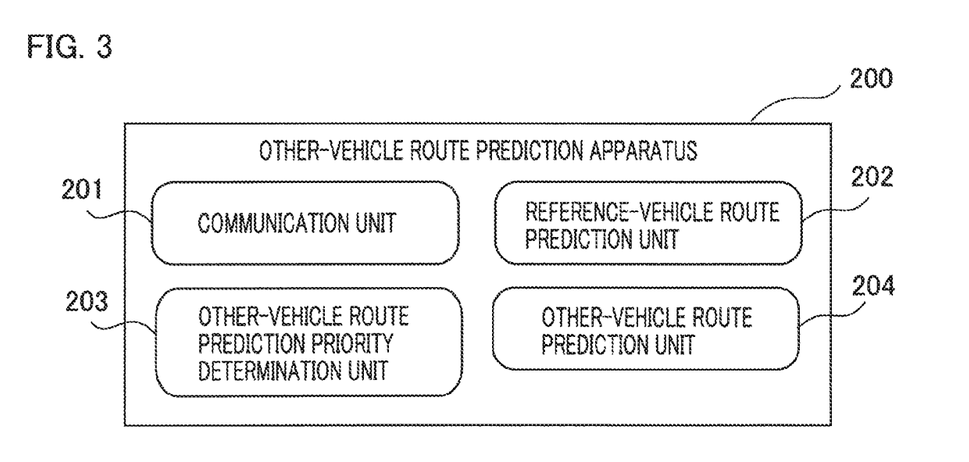
FIG. 3 is a block diagram of an other-vehicle route prediction apparatus according to Embodiment 2 of the present invention.

Hereinafter, an other-vehicle route prediction apparatus according to Embodiment 2 of the present invention will be explained in detail, based on the drawings. FIG. 3 is a block diagram of an other-vehicle route prediction apparatus according to Embodiment 2 of the present invention. In FIG. 3, an other-vehicle route prediction apparatus 200 is provided with a communication unit 201 as a communicator, a reference-vehicle route prediction unit 202 as a reference-vehicle route predictor, an other-vehicle route prediction priority determination unit 203 as an other-vehicle route prediction priority determiner, and an other-vehicle route prediction unit 204 as an other-vehicle route predictor.

In the other-vehicle route prediction apparatus 200 according to Embodiment 2 of the present invention, at least part of the communication unit 201, the reference-vehicle route prediction unit 202, the other-vehicle route prediction priority determination unit 203, and the other-vehicle route prediction unit 204 can be configured by use of a predetermined program stored in a memory and a microprocessor that implements processing, based on the program, as shown in FIG. 7. That is, FIG. 7 is a block diagram showing the example of the hardware composition of the other-vehicle route prediction apparatus according to Embodiment 2. In FIG. 7, the processing apparatus 1 is composed of a microprocessor 2 and a storage device 3. The storage device 3 includes, although not shown, a volatile storage device such as a random access memory, and a nonvolatile auxiliary storage device such as a flash memory. The storage device 3 may include, instead of a flash memory, an auxiliary storage device such as a hard disk. The microprocessor 2 executes a program loaded from the storage device 3. In this case, the program is loaded from the auxiliary storage device to the microprocessor 2 via the volatile storage device. The microprocessor 2 may output data of the calculation result and the like to the volatile storage device of the storage device 3, or may store the data in the auxiliary storage device via the volatile storage device.

The communication unit 201 and the reference-vehicle route prediction unit 202 have respective configurations and functions that are substantially the same as those of the communication unit 101 and the reference-vehicle route prediction unit 102 in FIG. 1, which have been explained in the road shape prediction apparatus 100 according to Embodiment 1.

Figure 4:
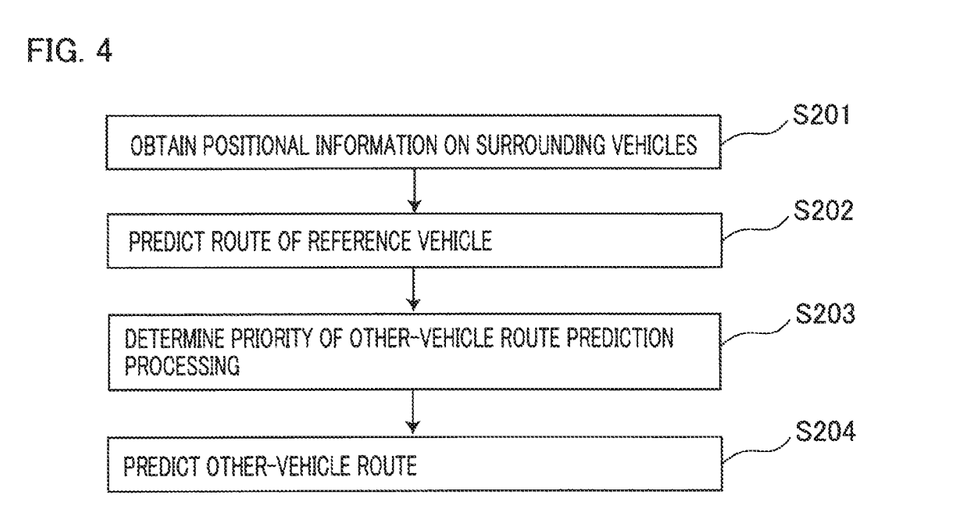
FIG. 4 is a flowchart representing the processing by the other-vehicle route prediction apparatus according to Embodiment 2 of the present invention.

FIG. 4 is a flowchart representing the processing by the other-vehicle route prediction apparatus according to Embodiment 2 of the present invention. In FIG. 4, the step S201 and the step S202 are the same as the step S101 and the step S102, respectively, in FIG. 2 explained in Embodiment 1. In the following explanation, the contents of processing in each of the steps S203 and S204 will mainly be explained.

In the step S203, the other-vehicle route prediction apparatus 200 determines the priority of other-vehicle route prediction processing, by use of the other-vehicle route prediction priority determination unit 203. In the other-vehicle route prediction processing by the other-vehicle route prediction priority determination unit 203, it is determined that the priorities of other vehicles existing in the area, from which the other vehicles can approach a future reference-vehicle position determined through reference-vehicle route prediction by the reference-vehicle route prediction unit 202, are high. In other words, for example, at first, the other-vehicle route prediction priority determination unit 203 determines that the priorities of the other vehicles existing in the vicinity of the reference vehicle are high.

The road shape prediction priority determination unit 103 in the road shape prediction apparatus 100 according to foregoing Embodiment 1 determines that the priority of the backward area of the reference vehicle is low, when a reference vehicle travels forward; however, the other-vehicle route prediction priority determination unit 203 in the other-vehicle route prediction apparatus 200 according to Embodiment 2 determines that the priority of the backward area of the reference vehicle is also high, because when changing traffic lanes, the reference vehicle may be rear-ended by a following vehicle traveling on an adjacent traffic lane.

The road shape prediction priority determination unit 103 in the road shape prediction apparatus 100 according to foregoing Embodiment 1 determines that the priority of the left-hand area of the reference vehicle is low, when it is predicted that the reference vehicle turns to the right; however, the other-vehicle route prediction priority determination unit 203 in the other-vehicle route prediction apparatus 200 according to Embodiment 2 determines that the priority of the left-hand area of the reference vehicle that turns to the right is high, because when turning to the right, the reference vehicle may make contact with another vehicle traveling on a lane that is at the left-hand side of the reference vehicle turning to the right. In this regard, however, because the probability that a vehicle that is in the left-hand and backward area of the reference vehicle turning to the right but does not exist in the vicinity of the reference vehicle immediately approach the route of the reference vehicle when the reference vehicle turns to the right is low, the other-vehicle route prediction priority determination unit 203 determines that the priorities of other vehicles that are in the left-hand and backward area of the reference vehicle turning to the right but do not exist in the vicinity of the reference vehicle are low.

Furthermore, the road shape prediction priority determination unit 103 in the road shape prediction apparatus 100 according to foregoing Embodiment 1 determines that the priority of the right-hand area of the reference vehicle is low, when it is predicted that the reference vehicle turns to the left; however, the other-vehicle route prediction priority determination unit 203 in the other-vehicle route prediction apparatus 200 according to Embodiment 2 determines that the priority of the right-hand area of the reference vehicle that turns to the left is high, because when turning to the left, the reference vehicle may make contact with another vehicle traveling on a traffic lane that is at the right-hand side of the reference vehicle turning to the left. In this regard, however, because the probability that a vehicle that is in the right-hand and backward area of the reference vehicle turning to the left but does not exist in the vicinity of the reference vehicle immediately approach the route of the reference vehicle when the reference vehicle turns to the left is low, the other-vehicle route prediction priority determination unit 203 determines that the priorities of other vehicles that are in the right-hand and backward area of the reference vehicle turning to the left but do not exist in the vicinity of the reference vehicle are low.

Next, in the step S204, the other-vehicle route prediction apparatus 200 predicts the route of another vehicle, by use of the other-vehicle route prediction unit 204. For example, when checking the progress of the positional information on one and the same other vehicle and then determining that the other vehicle is traveling straightforward, the other-vehicle route prediction unit 204 predicts that the probability that the other vehicle travels straightforward also at the next instant is high. When another vehicle is at a standstill, the other-vehicle route prediction unit 204 predicts that the vehicle may turn to the right or left. Moreover, when data on the speed and the direction is added to the positional information on another vehicle, the other-vehicle route prediction unit 204 can predict the next-instant position of the vehicle through a calculation.

When predicting the routes of other vehicles, the other-vehicle route prediction unit 204 performs processing for predicting the routes of other vehicles in a procedure corresponding to the priority determined in the step S203. For example, the other-vehicle route prediction unit 204 performs processing in such a way as to lengthen the time for prediction or the distance to be predicted in predicting the routes of other vehicles existing in a high-priority area. When there exist a great number of presumable routes of other vehicles, the other-vehicle route prediction unit 204 performs processing in such a way as to reserve more candidate routes for the other vehicles existing in a high-priority area.

In the other-vehicle route prediction apparatus according to foregoing Embodiment 2 of the present invention, in the case where based on other-vehicle positional information, the routes of other vehicles existing in the vicinity of a reference vehicle are predicted, the processing resource is provided intensively to the processing for predicting the routes of other vehicles existing in the area, from which the other vehicles can approach the route of the reference vehicle, so that the route of the other vehicle having a high risk of colliding with the reference vehicle can be predicted while the total processing load is suppressed from increasing.

The other-vehicle route prediction apparatus according to Embodiment 2 of the present invention, described heretofore, is obtained by converting the inventions, described below, into tangible forms.

(7) An other-vehicle route prediction apparatus comprising:
a communicator provided in a reference vehicle to receive, through wireless communication, positional information pieces on other vehicles from the other vehicles that exist on a road on which the reference vehicle travels and that are in the vicinity of the reference vehicle;
a reference-vehicle route predictor to predict a route of the reference vehicle, based on at least one of a driving state of the reference vehicle and a positional relationship between the reference vehicle and the other vehicles existing in the vicinity of the reference vehicle;
an other-vehicle route predictor to predict the routes of the other vehicles existing in the vicinity of the reference vehicle, based on the positional information pieces, on the other vehicles existing in the vicinity of the reference vehicle, that are obtained from the communicator; and
an other-vehicle route prediction priority determiner to determine the priorities of areas in the vicinity of the reference vehicle in the case where the other-vehicle route predictor predicts the routes of the other vehicles for the route, of the reference vehicle, that is predicted by the reference-vehicle route predictor.

(8) The other-vehicle route prediction apparatus according to (7),
wherein the driving state of the reference vehicle is based on setting of a gear of a transmission of the reference vehicle,
wherein in the case where the gear is set to a position for making the reference vehicle travel forward, the reference-vehicle route predictor determines that the probability that the reference vehicle travels forward is high and then predicts the route of the reference vehicle, and wherein in the case where the gear is set to a position for making the reference vehicle travel backward, the reference-vehicle route predictor determines that the probability that the reference vehicle travels backward is high and then predicts the route of the reference vehicle.

(9) The other-vehicle route prediction apparatus according to (7), wherein the driving state of the reference vehicle is based on an indication of a winker light that indicates a traveling direction of the reference vehicle, wherein in the case where the indication of the winker light indicates that the reference vehicle turns to the right, the reference-vehicle route predictor determines that the probability that the reference vehicle turns to the right or travels straightforward and then turns to the right is high and then predicts the route of the reference vehicle, wherein in the case where the indication of the winker light indicates that the reference vehicle turns to the left, the reference-vehicle route predictor determines that the probability that the reference vehicle turns to the left or travels straightforward and then turns to the left is high and then predicts the route of the reference vehicle, and wherein in the case where the indication of the winker light indicates that the reference vehicle neither turns to the right nor turns to the left, the reference-vehicle route predictor determines that the probability that the reference vehicle travels straightforward is high and then predicts the route of the reference vehicle.

(10) The other-vehicle route prediction apparatus according to (7), wherein in the case where based on a relationship between the positional information pieces, on the other vehicles in the vicinity of the reference vehicle, that are obtained from the communicator and the positional information on the reference vehicle, it is determined that the reference vehicle exists on the right-hand traffic lane of the road, the reference-vehicle route predictor determines that the probability that the reference vehicle travels straightforward or turns to the right is high, and wherein in the case where based on a relationship between the positional information pieces, on the other vehicles in the vicinity of the reference vehicle, that are obtained from the communicator and the positional information on the reference vehicle, it is determined that the reference vehicle exists on the left-hand traffic lane of the road, the reference-vehicle route predictor determines that the probability that the reference vehicle travels straightforward or turns to the left is high.

(11) The other-vehicle route prediction apparatus according to (7), wherein the other-vehicle route predictor predicts the routes of the other vehicles existing in the high-priority area determined by the other-vehicle route prediction priority determiner, based on a time and a distance that are longer than those for the routes of the other vehicles existing in areas other than the high-priority area, and wherein the other-vehicle route predictor predicts the routes of the other vehicles existing in the low-priority area determined by the other-vehicle route prediction priority determiner, based on a time that is shorter than the time for predicting the routes of the other vehicle existing in the high-priority area or based on a distance that is shorter than the distance for predicting the routes.

(12) The other-vehicle route prediction apparatus according to (7), wherein in the high-priority area determined by the other-vehicle route prediction priority determiner, the other-vehicle route predictor makes the number of prediction candidates for predicting the routes of the other vehicles larger than the number of prediction candidates for predicting the routes of the other vehicles in areas other than the high-priority area, and wherein in the low-priority area determined by the other-vehicle route prediction priority determiner, the other-vehicle route predictor makes the number of prediction candidates for predicting the routes of the other vehicles smaller than the number of prediction candidates for predicting the routes of the other vehicles existing in the high-priority area.

Embodiment 3

A driving assistance apparatus according to Embodiment 3 of the present invention predicts a road shape and an other-vehicle route, based on reference-vehicle route prediction, determines the risk of collision with other vehicle based on the result of the prediction, and then performs driving assistance. Hereinafter, a driving assistance apparatus according to Embodiment 3 of the present invention will be explained in detail, by use of the drawings.

Figure 5:
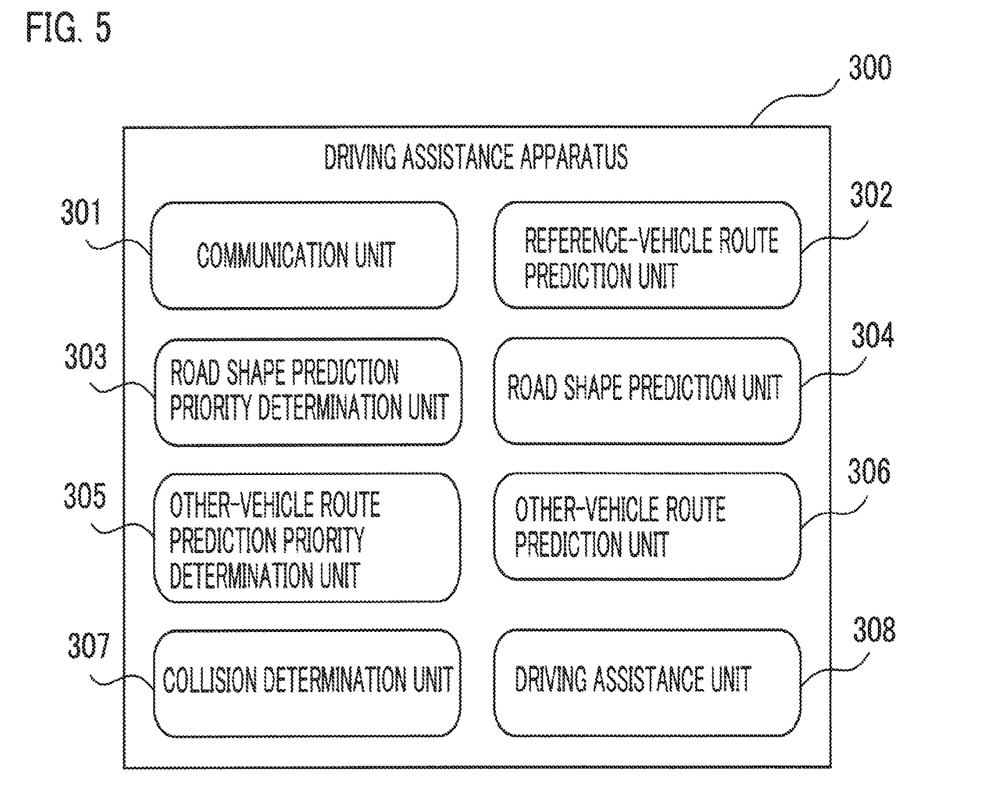
FIG. 5 is a block diagram of a driving assistance apparatus according to Embodiment 3 of the present invention.

FIG. 5 is a block diagram of a driving assistance apparatus according to Embodiment 3 of the present invention. In FIG. 5, a driving assistance apparatus 300 is provided with a communication unit 301 as a communicator, a reference-vehicle route prediction unit 302 as a reference-vehicle route predictor, a road shape prediction priority determination unit 303 as a road shape prediction priority determiner, a road shape prediction unit 304 as a road shape predictor, an other-vehicle route prediction priority determination unit 305 as an other-vehicle route prediction priority determiner, an other-vehicle route prediction unit 306 as an other-vehicle route predictor, a collision determination unit 307 as a collision determiner, and a driving assistance unit 308 as a driving assistor. The communication unit 301, the reference-vehicle route prediction unit 302, the road shape prediction priority determination unit 303, and the road shape prediction unit 304 have the same functions of the communication unit 101, the reference-vehicle route prediction unit 102, the road shape prediction priority determination unit 103, and the road shape prediction unit 104, respectively, in FIG. 1, explained in foregoing Embodiment 1. The other-vehicle route prediction priority determination unit 305 and the other-vehicle route prediction unit 306 have the same functions of the other-vehicle route prediction priority determination unit 203 and the other-vehicle route prediction unit 204, respectively, in FIG. 3, explained in foregoing Embodiment 2.

In the driving assistance apparatus 300 according to Embodiment 3 of the present invention, at least part of the communication unit, the reference-vehicle route prediction unit 302, the road shape prediction priority determination unit 303, the road shape prediction unit 304, the other-vehicle route prediction priority determination unit 305, the other-vehicle route prediction unit 306, the collision determination unit 307, and at least part of the driving assistance unit 308 can be configured by use of a predetermined program stored in a memory and a microprocessor that implements processing, based on the program, as shown in FIG. 7. That is, FIG. 7 is a block diagram showing the example of the driving assistance apparatus according to Embodiment 3. In FIG. 7, the processing apparatus 1 is composed of a microprocessor 2 and a storage device 3. The storage device 3 includes, although not shown, a volatile storage device such as a random access memory, and a nonvolatile auxiliary storage device such as a flash memory.

The storage device 3 may include, instead of a flash memory, an auxiliary storage device such as a hard disk. The microprocessor 2 executes a program loaded from the storage device 3. In this case, the program is loaded from the auxiliary storage device to the microprocessor 2 via the volatile storage device. The microprocessor 2 may output data of the calculation result and the like to the volatile storage device of the storage device 3, or may store the data in the auxiliary storage device via the volatile storage device.

Figure 6:
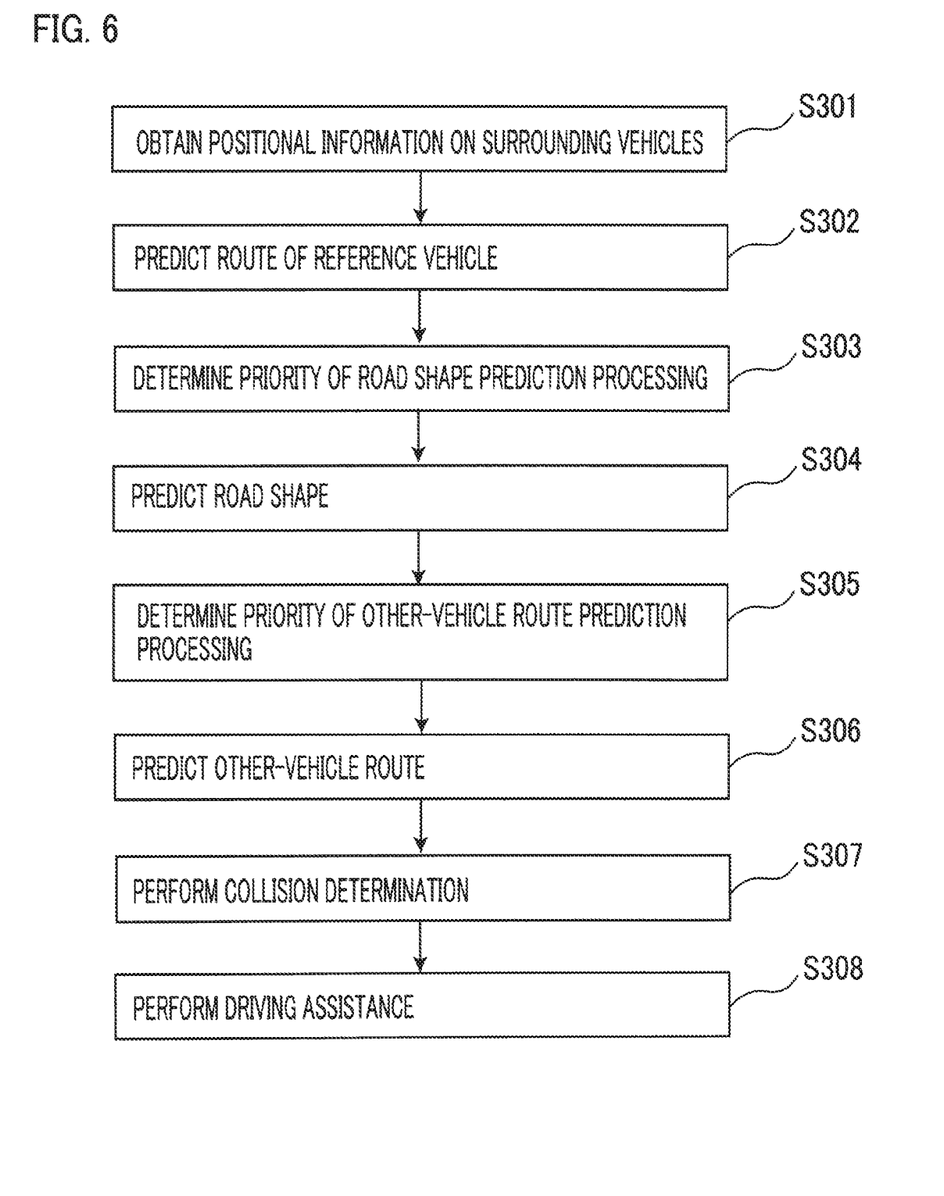
FIG. 6 is a flowchart representing the processing by the driving assistance apparatus according to Embodiment 3 of the present invention.

FIG. 6 is a flowchart representing the processing by the driving assistance apparatus according to Embodiment 3 of the present invention. In FIG. 6, the steps S301 through S304 are the same as the steps S101 through S104, respectively, in FIG. 2 explained in Embodiment 1. The step S305 and the step S306 are the same as the step S203 and the step S204, respectively, in FIG. 4 explained in Embodiment 2. In the following explanation, the contents of processing in each of the steps S307 and S308 will mainly be explained.

In the step S307, the driving assistance apparatus 300 predicts a collision between a reference vehicle and another vehicle, by use of the collision determination unit 307. For example, when based on reference-vehicle route prediction based on processing by the reference-vehicle route prediction unit 302 and other-vehicle route prediction based on processing by the other-vehicle route prediction unit 306, it is determined that the reference vehicle and another vehicle approach each other above a certain limit, the collision determination unit 307 determines that there exists a risk that the reference vehicle and another vehicle collide with each other.

With regard to collision prediction by the collision determination unit 307, the prediction accuracy may be raised by predicting a road shape. For example, even in the case where at a crossing, there exists another vehicle that is approaching a reference vehicle in the transverse direction of the reference vehicle, the collision determination unit 307 can determine that there exists no risk that the reference vehicle collides with the approaching another vehicle, when from road-shape prediction, it has been known that the crossing is a grade separation.

In the step S308, the driving assistance apparatus 300 performs driving assistance corresponding to the foregoing collision prediction in the step S307, by use of the driving assistance unit 308. The driving assistance for the reference vehicle, which is performed by the driving assistance unit 308, may be notified to the driver through sound or video; alternatively, the system of the driving assistance unit 308 may control the driving system of the vehicle in such a way as to avoid the collision.

In the foregoing driving assistance apparatus according to Embodiment 3 of the present invention, in the case where based on reference-vehicle route prediction and other-vehicle route prediction, determination on collision between a reference vehicle and another vehicle is performed, it is made possible to perform the determination considering the road shape; in addition to that, by providing the processing resource preferentially to a high-priority area, driving assistance can be provided without damaging the real-time property, even when due to a great number of other vehicles as communication subjects, the processing load is large.

The driving assistance apparatus according to Embodiment 3 of the present invention, described heretofore, is obtained by converting the inventions, described below, into tangible forms.

(13) A driving assistance apparatus comprising:
a communicator provided in a reference vehicle to receive, through wireless communication, positional information pieces on other vehicles from the other vehicles that exist on a road on which the reference vehicle travels and that are in the vicinity of the reference vehicle,
a reference-vehicle route predictor to predict a route of the reference vehicle, based on at least one of a driving state of the reference vehicle and a positional relationship between the reference vehicle and the other vehicles existing in the vicinity of the reference vehicle,
a road shape predictor to predict the shape of the road, based on the positional information pieces, on the other vehicles existing in the vicinity of the reference vehicle, that are obtained from the communicator,
a road shape prediction priority determiner to determine the priorities of areas in the vicinity of the reference vehicle, for which the road shape prediction unit predicts the shape of the road,
an other-vehicle route predictor to predict the routes of the other vehicles existing in the vicinity of the reference vehicle, based on the positional information pieces, on the other vehicles existing in the vicinity of the reference vehicle, that are obtained from the communicator,
an other-vehicle route prediction priority determiner to determine the priorities of areas in the vicinity of the reference vehicle, for which the other-vehicle route prediction unit predicts the routes of the other vehicles,
a collision determiner to determine a risk of collision between the reference vehicle and the other vehicles, based on the route, of the reference vehicle, that is predicted by the reference-vehicle route predictor and the routes, of the other vehicles, that are predicted by the other-vehicle route predictor, and
a driving assistor to perform driving assistance for the reference vehicle in accordance with the risk of collision, determined by the collision determiner.

(14) The driving assistance apparatus according to (13), wherein the collision determiner determines the risk of collision while considering the road shape predicted by the road shape predictor.

What is claimed is:
1. A road shape prediction apparatus comprising:
a communicator provided in a reference vehicle to receive, through wireless communication, positional information pieces about other vehicles from the other vehicles that exist on a road on which the reference vehicle travels and that are in the vicinity of the reference vehicle; and
a processor configured to execute:
a reference-vehicle route predictor to predict a route of the reference vehicle, based on at least one of a driving state of the reference vehicle and a positional relationship between the reference vehicle and the other vehicles existing in the vicinity of the reference vehicle;
a road shape predictor to predict the shape of the road on which the reference vehicle travels, based on the positional information pieces, about the other vehicles existing in the vicinity of the reference vehicle, that are obtained from the communicator; and
a road shape prediction priority determiner to determine the priorities of areas in the vicinity of the reference vehicle in the case where the road shape predictor predicts the shape of the road for the route, of the reference vehicle, that is predicted by the reference-vehicle route predictor,
wherein the road shape predictor predicts the shape of the road in such a way that the amount of positional information about a first other vehicle existing in the area, the priority, determined by the road shape prediction priority determiner, of which is high is made to be larger than the amount of positional information about a second other vehicle existing in an area other than the high-priority area, and
wherein the road shape predictor predicts the shape of the road in such a way that the amount of positional information about a third other vehicle existing in the area, the priority, determined by the road shape prediction priority determiner, of which is low is made to be smaller than the amount of positional information the first other vehicle existing in the high-priority area.

2. The road shape prediction apparatus according to claim 1,
wherein the driving state of the reference vehicle is based on setting of a gear of a transmission of the reference vehicle,
wherein in the case where the gear is set to a position for making the reference vehicle travel forward, the reference-vehicle route predictor determines that the probability that the reference vehicle travels forward is high and then predicts the route of the reference vehicle, and
wherein in the case where the gear is set to a position for making the reference vehicle travel backward, the reference-vehicle route predictor determines that the probability that the reference vehicle travels backward is high and then predicts the route of the reference vehicle.

3. The road shape prediction apparatus according to claim 1,
wherein the driving state of the reference vehicle is based on an indication of a winker light that indicates a traveling direction of the reference vehicle,
wherein in the case where the indication of the winker light indicates that the reference vehicle turns to the right, the reference-vehicle route predictor determines that the probability that the reference vehicle turns to the right or travels straightforward and then turns to the right is high and then predicts the route of the reference vehicle,
wherein in the case where the indication of the winker light indicates that the reference vehicle turns to the left, the reference-vehicle route predictor determines that the probability that the reference vehicle turns to the left or travels straightforward and then turns to the left is high and then predicts the route of the reference vehicle, and
wherein in the case where the indication of the winker light indicates that the reference vehicle neither turns to the right nor turns to the left, the reference-vehicle route predictor determines that the probability that the reference vehicle travels straightforward is high and then predicts the route of the reference vehicle.

4. The road shape prediction apparatus according to claim 1,
wherein in the case where based on a relationship between the positional information pieces, about the other vehicles in the vicinity of the reference vehicle, that are obtained from the communicator and the positional information about the reference vehicle, it is determined that the reference vehicle exists on the right-hand traffic lane of the road, the reference-vehicle route predictor determines that the probability that the reference vehicle travels straightforward or turns to the right is high, and
wherein in the case where based on a relationship between the positional information pieces, about the other vehicles in the vicinity of the reference vehicle, that are obtained from the communicator and the positional information about the reference vehicle, it is determined that the reference vehicle exists on the left-hand traffic lane of the road, the reference-vehicle route predictor determines that the probability that the reference vehicle travels straightforward or turns to the left is high.

5. The road shape prediction apparatus according to claim 1,
wherein in the area, the priority, determined by the road shape prediction priority determiner, of which is high, the road shape predictor makes the period of processing for predicting the shape of the road shorter than the period of processing for predicting the shape of the road in areas other than the high-priority area, and
wherein in the area, the priority, determined by the road shape prediction priority determiner, of which is low, the road shape predictor makes the period of processing for predicting the shape of the road longer than the period of processing for predicting the shape of the road in the high-priority area.

6. The road shape prediction apparatus according to claim 1, wherein the road shape predictor determines a path of another vehicle from among the other vehicles and predicts the shape of the road as corresponding to the path of the other vehicle.

7. The road shape prediction apparatus according to claim 1, wherein the driving state of the reference vehicle includes a lane of the road in which the reference vehicle travels.

8. An other-vehicle route prediction apparatus comprising:
a communicator provided in a reference vehicle to receive, through wireless communication, positional information pieces about other vehicles from the other vehicles that exist on a road on which the reference vehicle travels and that are in the vicinity of the reference vehicle; and
a processor configured to execute:
a reference-vehicle route predictor to predict a route of the reference vehicle, based on at least one of a driving state of the reference vehicle and a positional relationship between the reference vehicle and the other vehicles existing in the vicinity of the reference vehicle;
an other-vehicle route predictor to predict the routes of the other vehicles existing in the vicinity of the reference vehicle, based on the positional information pieces, on about the other vehicles existing in the vicinity of the reference vehicle, that are obtained from the communicator; and
an other-vehicle route prediction priority determiner to determine the priorities of areas in the vicinity of the reference vehicle in the case where the other-vehicle route predictor predicts the routes of the other vehicles for the route, of the reference vehicle, that is predicted by the reference-vehicle route predictor,
wherein the other-vehicle route prediction priority determiner determines the priorities of the areas based on the driving state of the reference vehicle,
wherein the other-vehicle route predictor predicts the routes of the other vehicles in such a way that the amount of positional information about a first other vehicle existing in the area, the priority, determined by the other-vehicle route prediction priority determiner, of which is high is made to be larger than the amount of positional information about a second other vehicle existing in an area other than the high-priority area, and wherein the other-vehicle route predictor predicts the routes of the other vehicles in such a way that the amount of positional information about a third other vehicle existing in the area, the priority, determined by the other-vehicle route prediction priority determiner, of which is low is made to be smaller than the amount of positional information on the first other vehicle existing in the high-priority area.

9. The other-vehicle route prediction apparatus according to claim 8, wherein the driving state of the reference vehicle is based on setting of a gear of a transmission of the reference vehicle, wherein in the case where the gear is set to a position for making the reference vehicle travel forward, the reference-vehicle route predictor determines that the probability that the reference vehicle travels forward is high and then predicts the route of the reference vehicle, and wherein in the case where the gear is set to a position for making the reference vehicle travel backward, the reference-vehicle route predictor determines that the probability that the reference vehicle travels backward is high and then predicts the route of the reference vehicle.

10. The other-vehicle route prediction apparatus according to claim 8, wherein the driving state of the reference vehicle is based on an indication of a winker light that indicates a traveling direction of the reference vehicle, wherein in the case where the indication of the winker light indicates that the reference vehicle turns to the right, the reference-vehicle route predictor determines that the probability that the reference vehicle turns to the right or travels straightforward and then turns to the right is high and then predicts the route of the reference vehicle, wherein in the case where the indication of the winker light indicates that the reference vehicle turns to the left, the reference-vehicle route predictor determines that the probability that the reference vehicle turns to the left or travels straightforward and then turns to the left is high and then predicts the route of the reference vehicle, and wherein in the case where the indication of the winker light indicates that the reference vehicle neither turns to the right nor turns to the left, the reference-vehicle route predictor determines that the probability that the reference vehicle travels straightforward is high and then predicts the route of the reference vehicle.

11. The other-vehicle route prediction apparatus according to claim 8, wherein in the case where based on a relationship between the positional information pieces, about the other vehicles in the vicinity of the reference vehicle, that are obtained from the communicator and the positional information about the reference vehicle, it is determined that the reference vehicle exists on the right-hand traffic lane of the road, the reference-vehicle route predictor determines that the probability that the reference vehicle travels straightforward or turns to the right is high, and wherein in the case where based on a relationship between the positional information pieces, about the other vehicles in the vicinity of the reference vehicle, that are obtained from the communicator and the positional information about the reference vehicle, it is determined that the reference vehicle exists on the left-hand traffic lane of the road, the reference-vehicle route predictor determines that the probability that the reference vehicle travels straightforward or turns to the left is high.

12. The other-vehicle route prediction apparatus according to claim 8, wherein the other-vehicle route predictor predicts the route of the first other vehicle existing in the high-priority area determined by the other-vehicle route prediction priority determiner, based on a time and a distance that are longer than those for the route of the second other vehicle existing in the area other than the high-priority area, and wherein the other-vehicle route predictor predicts the route of the third other vehicle existing in the low-priority area determined by the other-vehicle route prediction priority determiner, based on a time that is shorter than the time for predicting the route of the first other vehicle existing in the high-priority area or based on a distance that is shorter than the distance for predicting the routes.

13. The other-vehicle route prediction apparatus according to claim 8, wherein in the high-priority area determined by the other-vehicle route prediction priority determiner, the other-vehicle route predictor makes the number of prediction candidates for predicting the routes of the other vehicles larger than the number of prediction candidates for predicting the routes of the other vehicles in areas other than the high-priority area, and wherein in the low-priority area determined by the other-vehicle route prediction priority determiner, the other-vehicle route predictor makes the number of prediction candidates for predicting the routes of the other vehicles smaller than the number of prediction candidates for predicting the routes of the other vehicles existing in the high-priority area.

14. The road shape prediction apparatus according to claim 8, wherein the driving state of the reference vehicle includes a lane of the road in which the reference vehicle travels.

15. A driving assistance apparatus comprising:

a communicator provided in a reference vehicle to receive, through wireless communication, positional information pieces about other vehicles from the other vehicles that exist on a road on which the reference vehicle travels and that are in the vicinity of the reference vehicle; and a processor configured to execute:

a reference-vehicle route predictor to predict a route of the reference vehicle, based on at least one of a driving state of the reference vehicle and a positional relationship between the reference vehicle and the other vehicles existing in the vicinity of the reference vehicle, a road shape predictor to predict the shape of the road on which the reference vehicle travels, based on the positional information pieces, on the other vehicles existing in the vicinity of the reference vehicle, that are obtained from the communicator, a road shape prediction priority determiner to determine the priorities of areas in the vicinity of the reference vehicle, for which the road shape predictor predicts the shape of the road, an other-vehicle route predictor to predict the routes of the other vehicles existing in the vicinity of the reference vehicle, based on the positional information pieces, on about the other vehicles existing in the vicinity of the reference vehicle, that are obtained from the communicator, an other-vehicle route prediction priority determiner to determine the priorities of areas in the vicinity of the reference vehicle, for which the other-vehicle route predictor predicts the routes of the other vehicles, a collision determiner to determine a risk of collision between the reference vehicle and the other vehicles, based on the route, of the reference vehicle, that is predicted by the reference-vehicle route predictor and the routes, of the other vehicles, that are predicted by the other-vehicle route predictor, and a driving assistor to perform driving assistance for the reference vehicle in accordance with the risk of collision, determined by the collision determiner, wherein the road shape predictor predicts the shape of the road in such a way that the amount of positional information about a first other vehicle existing in the area, the priority, determined by the road shape prediction priority determiner, of which is high is made to be larger than the amount of positional information about a second other vehicle existing in an area other than the high-priority area, and wherein the road shape predictor predicts the shape of the road in such a way that the amount of positional information about a third other vehicle existing in the area, the priority, determined by the road shape prediction priority determiner, of which is low is made to be smaller than the amount of positional information about the first other vehicle existing in the high-priority area.

16. The driving assistance apparatus according to claim 15, wherein the collision determiner determines the risk of collision while considering the road shape predicted by the road shape predictor.

17. The road shape prediction apparatus according to claim 15, wherein the driving state of the reference vehicle includes a lane of the road in which the reference vehicle travels.

* * * * *